United States Patent
Cho et al.

(10) Patent No.: US 11,332,863 B2
(45) Date of Patent: May 17, 2022

(54) NON-WOVEN FABRIC WITH ENHANCED HARDNESS AND SOUND ABSORPTION, MANUFACTURING METHOD THEREFOR, AND AUTOMOTIVE UNDERCOVER COMPRISING NON-WOVEN FABRIC WITH ENHANCED HARDNESS AND SOUND ABSORPTION

(71) Applicant: KOLON INDUSTRIES, INC., Seoul (KR)

(72) Inventors: Hee-jung Cho, Gyeonggi-do (KR); Min-ho Lee, Gyeonggi-do (KR); Young-shin Park, Gyeonggi-do (KR); Gyu-in Jung, Gyeonggi-do (KR); Woo-seok Choi, Gyeonggi-do (KR)

( * ) Notice: Subject to any disclaimer, the term of this patent is extended or adjusted under 35 U.S.C. 154(b) by 218 days.

(21) Appl. No.: 16/497,994

(22) PCT Filed: Feb. 21, 2018

(86) PCT No.: PCT/KR2018/002124
§ 371 (c)(1),
(2) Date: Sep. 26, 2019

(87) PCT Pub. No.: WO2018/182177
PCT Pub. Date: Oct. 4, 2018

(65) Prior Publication Data
US 2020/0040498 A1  Feb. 6, 2020

(30) Foreign Application Priority Data
Mar. 31, 2017 (KR) .......................... 10-2017-0041657

(51) Int. Cl.
*D04H 3/018* (2012.01)
*D04H 3/011* (2012.01)
(Continued)

(52) U.S. Cl.
CPC ............. *D04H 3/018* (2013.01); *D04H 3/011* (2013.01); *D04H 3/153* (2013.01); *B60R 13/083* (2013.01);
(Continued)

(58) Field of Classification Search
CPC ........ D04H 3/018; D04H 3/011; D04H 3/153; D04H 1/435; D04H 1/4374; D04H 13/00;
(Continued)

(56) References Cited

U.S. PATENT DOCUMENTS

2003/0049988 A1* 3/2003 Ortega ..................... D04H 3/16
442/334
2009/0246492 A1* 10/2009 Bishop ..................... D04H 3/16
428/219
(Continued)

FOREIGN PATENT DOCUMENTS

JP    0929021 A    2/1997
JP    11-170923 A  6/1999
(Continued)

OTHER PUBLICATIONS

International Search Report for PCT/KR2018/002124 dated Jun. 27, 2018 [PCT/ISA/210].

*Primary Examiner* — Elizabeth C Imani

(57) ABSTRACT

The present invention relates to non-woven fabric with enhanced hardness and sound absorption, more specifically to non-woven fabric that includes two or more kinds of polyester-based materials and non-circular cross-section fiber, and thus has enhanced hardness and sound absorption as well as improved formability, and that can be applied for an automotive undercover.

2 Claims, 1 Drawing Sheet

(51) Int. Cl.
   *D04H 3/153* (2012.01)
   *B60R 13/08* (2006.01)
   *B62D 25/20* (2006.01)

(52) U.S. Cl.
   CPC ....... *B62D 25/2072* (2013.01); *Y10T 442/611* (2015.04)

(58) Field of Classification Search
   CPC .............. B60R 13/083; B60R 13/0861; B62D 25/2072; B62D 25/20; B32B 5/26; B32B 5/022; B32B 5/10; B32B 27/32; B32B 27/12; B32B 5/08; B32B 2307/546; B32B 2307/718; B32B 2307/54; B32B 2262/0276; B32B 2307/732; B32B 2262/14; B32B 2250/40; B32B 2307/10; B32B 2307/536; B32B 2571/00; B32B 2250/03; B32B 2605/00
   USPC ........................................................ 442/337
   See application file for complete search history.

(56) References Cited

U.S. PATENT DOCUMENTS

| | | |
|---|---|---|
| 2014/0070562 A1 | 3/2014 | Inagaki |
| 2017/0169809 A1* | 6/2017 | Takata .................... B60R 13/08 |

FOREIGN PATENT DOCUMENTS

| | | | | |
|---|---|---|---|---|
| JP | 11-255013 A | | 9/1999 | |
| JP | 2002283484 A | | 10/2002 | |
| JP | 2005-054295 A | | 3/2005 | |
| JP | 2015152889 A | * | 8/2015 | ............ D04H 1/485 |
| KR | 10-2003-0000746 A | | 1/2003 | |
| KR | 2003-0076890 A | | 9/2003 | |
| KR | 10-2005-0062136 A | | 6/2005 | |
| KR | 10-2011-0034522 A | | 4/2011 | |
| KR | 10-2014-0042982 A | | 4/2014 | |
| KR | 10-2017-0014074 A | | 2/2017 | |

* cited by examiner

NON-WOVEN FABRIC WITH ENHANCED HARDNESS AND SOUND ABSORPTION, MANUFACTURING METHOD THEREFOR, AND AUTOMOTIVE UNDERCOVER COMPRISING NON-WOVEN FABRIC WITH ENHANCED HARDNESS AND SOUND ABSORPTION

CROSS REFERENCE TO RELATED APPLICATIONS

This application is a National Stage of International Application No. PCT/KR2018/002124 filed Feb. 21, 2018, claiming priority based on Korean Patent Application Nos. 10-2017-0041657 filed Mar. 31, 2017.

TECHNICAL FIELD

The present invention relates to non-woven fabric with enhanced hardness and sound absorption, a manufacturing method therefor, and an automotive undercover including the same. More specifically, the present invention relates to non-woven fabric that includes two or more kinds of polyester-based materials and non-circular cross-section fiber, and thus, has enhanced hardness and sound absorption as well as enhanced formability, and can be applied as an automotive undercover.

BACKGROUND ART

An automotive undercover is a part in the form of a thin plate attached to the outermost layer at the bottom of an automobile, and is attached to an engine part or on the whole bottom surface according to the kind of automobile. Such an undercover is used to protect equipment at the lower part of an automobile from foreign substances generated from a road surface, prevent the inflow of foreign substances, and absorb or insulate sound of noise generated during running.

In general, an undercover consists of layers of various materials, and consists of nonwoven fabric (outside finish)/propylene film (PP film)/core (performing functions for maintaining the shape of an undercover and sound absorption·insulaton)/nonwoven fabric (inner side finish). Such an undercover is manufactured into the final product, by stacking materials making up each layer, laminating under a high temperature-high pressure condition to make it into a plate shape, laminating with other materials according to the construction of product layers and a mold shape according to the kind of automobiles, and forming under high temperature-high pressure.

Recently, with the active progress in development for light weight, cost reduction, and improved driving comfort in automobiles, the development of undercovers has also progressed. The required properties of an undercover basically include shape maintenance (rigidity), sound absorption/insulation, durability, and heat resistance, and in order to fulfill such requirements, novel materials are being developed. For example, when an undercover is attached to the bottom of an automobile, it should have rigidity for maintaining the shape, it should not be damaged or deformed by external foreign bodies such as stones, fragments, water (rain), and the like, it should maintain its shape even against heat generated by an engine, it should have excellent sound absorption/insulation, and it should have excellent formability in the forming process of manufacturing the final product.

Among the layers making up an undercover, as a core, glass fiber adhered by polypropylene (PP) or polyethylene (PE) powder is used. The glass fiber has a high unit weight, generates a lot of fragments in the preparation process, and is dangerous in that the fragments may invade into a human body through the respiratory system, and the like, to have a deleterious influence on the human body. Thus, the development of a novel material capable of replacing glass fiber is actively progressing.

For the core material, a first generation thermoplastic material, a second generation glass fiber and PP fiber, and a third generation composite material have been developed. The third generation polyester (PET) composite material is a product applied as a core by compression molding a nonwoven fabric consisting of two kinds of short fiber (PET and PET functioning as adhesive), and has advantages as a material that enables light weight and cost reduction, is harmless to the human body, and can be recycled.

However, nonwoven fabric consisting of short fibers has low rigidity compared to an inorganic material of glass fiber, and thus cannot sufficiently maintain the shape, and in order to prevent damage and deformation from the external foreign bodies, a large quantity of binder material should be used or surface processing should be done. Materials used for binder and surface processing may generate problems such as emitting poisonous gas during a fire, and do not have sufficient flame retardant performance required as an automobile material, particularly as a material that is attached to the lower part of an engine.

DETAILED DESCRIPTION OF THE INVENTION

Technical Problem

In order to solve the above problem, it is an object of the present invention to provide a non-woven fabric with enhanced hardness and sound absorption, and an automotive undercover including the same, by adjusting the kind and structure of polyester filaments in a non-woven fabric consisting of polyester filaments.

Technical Solution

In order to achieve the object, the present invention provides long fiber non-woven fabric with enhanced hardness and sound absorption, consisting of a first filament of polyester having a melting point of 250° C. or more with a non-circular cross-section, and a second filament of polyester having a melting point of 180° C. or less with a circular cross-section, wherein the non-circular cross-section is in the shape of "+" or "Y", the content of the second filament is 10~50 wt %, and the sound absorption coefficient (MS341-23 Spec., @5000 Hz) is 0.48 or less.

Further, the present invention provides an automotive undercover including long fiber non-woven fabric consisting of the first filament of polyester having a melting point of 250° C. or more with a non-circular cross-section, and the second filament of polyester having a melting point of 180° C. or less, wherein the non-circular cross-section is in the shape of "+" or "Y", the content of the second filament is 10~50 wt %, and the sound absorption coefficient (MS341-23 Spec., @5000 Hz) is 0.48 or less.

The present invention also provides a method for manufacturing non-woven fabric with enhanced hardness and sound absorption, including the steps of: preparing the first filament with a non-circular cross-section in the shape of "+"

or "Y" using polyester having a melting point of 250° C. or more; preparing the second filament using polyester having a melting point of 180° C. or less; mixing the first filament and the second filament such that the content of the second filament becomes 10~50 wt %, and preparing a nonwoven web using the obtained mixture; and treating the nonwoven web with hot air at a temperature that is lower than the temperature for laminating layers making up an undercover in a plate for an undercover and the temperature for forming an undercover.

In addition, the present invention provides a method for manufacturing an automotive undercover including the steps of: preparing the first filament with a non-circular cross-section in the shape of "+" or "Y" using polyester having a melting point of 250° C. or more; preparing the second filament using polyester having a melting point of 180° C. or less; mixing the first filament and the second filament such that the content of the second filament becomes 10~50 wt %, and preparing a nonwoven web using the obtained mixture; treating the nonwoven web with hot air at a temperature that is lower than the temperature for laminating layers making up an undercover in a plate for an undercover and the temperature for forming an undercover, thus obtaining non-woven fabric with enhanced hardness and sound absorption; sequentially stacking polyethylene terephthalate non-woven fabric, a polypropylene film, the non-woven fabric with enhanced hardness and sound absorption, and polyethylene terephthalate non-woven fabric, and laminating them to prepare it into a plate; and introducing the plate into a forming mold to prepare an undercover molded product of a desired shape.

Advantageous Effects

According to the present invention, by the high melting point filament with a non-circular cross-section in the non-woven fabric, sound absorption may be finally enhanced in an automotive undercover, and by the long fiber non-woven fabric consisting of a high melting point filament with a non-circular cross-section and a low melting point filament in the undercover, the hardness and formability of the undercover may be enhanced.

BEST MODE FOR CARRYING OUT THE INVENTION

Figure 1:
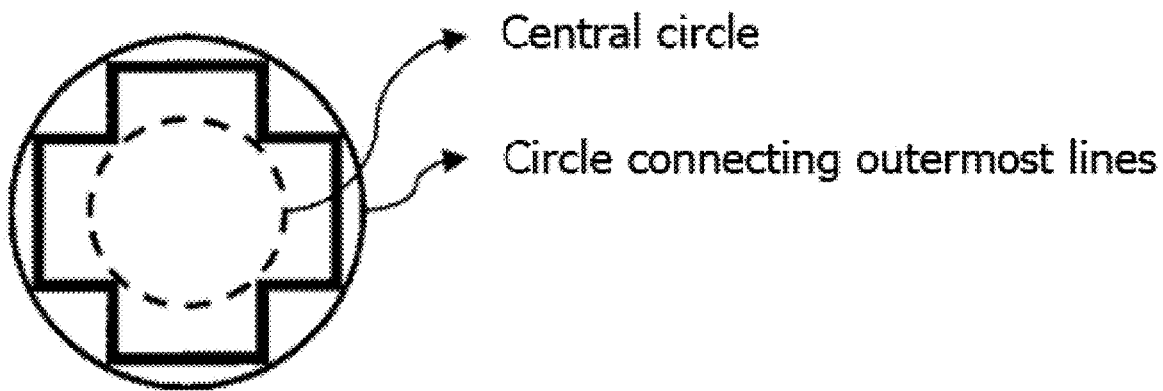
FIG. 1 is a mimetic diagram representing the bases (outermost circle and central circle) for measuring the degree of non-circular shape in the "+" shaped cross-section of the non-circular cross-section filament, according to one embodiment of the present invention.
Figure 2:
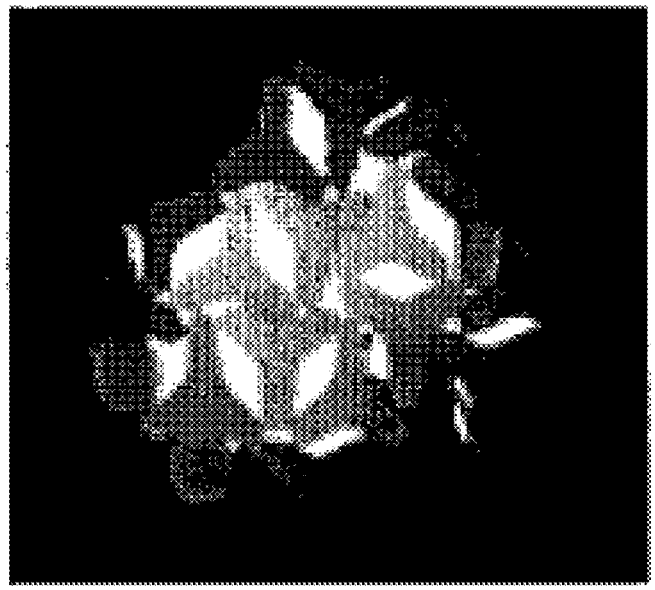
FIG. 2 is a mimetic diagram showing the "Y" shaped non-circular cross-section filament according to one embodiment of the present invention.

Hereinafter, the non-woven fabric and the method for manufacturing an automotive undercover of the present invention will be explained in detail.

A step of preparing the first filament with a non-circular cross-section may be conducted using polyester having a melting point of 250° C. or more.

The first filament is prepared to a fineness of 3-9 denier, by melting the polyester through a continuous extruder, discharging it through a spinneret, solidifying it with a quench air, and drawing at a spinning velocity of 4500~5000 m/min using a high pressure air drawing apparatus.

Wherein, it is preferable to control the fine holes of the spinneret such that the non-circular cross-section may be in the shape of "+" or "Y", and the degree of non-circular shape (diameter of a circle connecting the outermost lines of the cross-section of filament/diameter of the central circle of the cross-section of filament) of the non-circular cross-section may become 2.0~3.0.

Since the filament making up the non-woven fabric of the present invention has a non-circular cross-section in the shape of "+" or "Y", the sound absorption of the non-woven fabric may be enhanced. However, if the degree of non-circular shape of the non-circular cross-section is less than 2.0, due to small pores between the filaments, porosity and thickness may be decreased in the non-woven fabric, and thus sound absorption may be deteriorated, and if it exceeds 3.0, when spinning with a high degree of non-circular shape, cutting may be frequently generated, thus deteriorating spinning productivity, and the "+" or "Y" shape of the non-circular cross-section may not be maintained.

A step of preparing the second filament is conducted using polyester having a melting point of 180° C. or less.

The second filament is prepared to a fineness of 3-9 denier, by melting the polyester through a continuous extruder, discharging it through circular spinning nozzles, solidifying it with a quench air, and then drawing at a spinning velocity of 4500~5000 m/min using a high pressure air drawing apparatus.

By the second filament, the non-woven fabric of the present invention as described below may exhibit enhanced hardness and formability, in the process of manufacturing it into a plate for an undercover (prepared by stacking materials making up each layer and laminating them), or in the process of forming an undercover.

In the non-woven fabric of the present invention, if the fineness of the first filament and the second filament is less than 3 deniers, the filament may be thin and weak, and the number of filaments per unit area may increase, and thus sound absorption may be deteriorated, and to the contrary, if it exceeds 9 denier, cooling time for the crystallization of filaments may increase, making it difficult to commercially uniformly manufacture non-woven fabric.

A step of mixing the first filament and the second filament such that the content of the second filament becomes 10~50 wt %, and preparing a nonwoven web with the obtained mixture, is conducted.

The mixture of the first filament and the second filament is stacked in the form of a web at 1000~1500 g/m² on a conveyer net, the web is subjected to a calendering process using a calender roll heated to 150~160° C. so as to afford flatness, and hot air of a temperature (160~180° C.) that is lower than the lamination temperature for a plate for an undercover and the temperature at which an undercover is formed is applied to the web so as to achieve heat adhesion between the filaments, thus manufacturing non-woven fabric.

While the hot air passes from the top of the web to the bottom of the web, heat is applied to the web, thus manufacturing non-woven fabric. Herein, a time in which the conveyer net on which a web is formed passes through a hot air dryer in the form of a tenter, and treated, is 20~30 seconds. While hot air is applied, the second filaments become molten and connect between the neighboring first filaments, and then, when the hot air treatment is finished and a temperature becomes room temperature, the second filaments are solidified while connecting between the first filaments, and thus the non-woven fabric has enhanced strength and hardness.

Herein, if the content of the second filament in the mixture is less than 10 wt %, there may be few adhesion points between the filaments, and thus hardness required for an undercover may not be fulfilled, and if it exceeds 50 wt %, the rate of the first filaments forming a backbone so as to maintain the shape of non-woven fabric may decrease, and thus hardness may not be exhibited.

It is preferable that the temperature of the hot air is lower than the temperature at which a plate for an undercover is prepared or an undercover is formed, and more preferably, it is lower than the above-described temperature by 10° C. or less, and more than 160° C. If such a temperature condition is not fulfilled, namely, at a temperature equal to or higher than the temperature at which a plate for an undercover is prepared or an undercover is formed, the second filament may be heat set. Thus, at a temperature for preparing a plate for an undercover or forming an undercover, the second filament may not become molten, and thus may not function as an adhesive and may not exhibit elongation for forming, thus deteriorating hardness and formability.

The plate for an undercover of the present invention may be manufactured by placing a polypropylene film on a polyester non-woven fabric, placing the non-woven fabric of the present invention as the material of a core layer thereon, stacking a polyester non-woven fabric again thereon, and then laminating under a high temperature-high pressure condition.

As the polyester non-woven fabric, non-woven fabric consisting of common polyethylene terephthalate fiber may be used, and as the polypropylene film, common polypropylene films may be used.

After preheating the plate for an undercover thus prepared, it is introduced into a forming mold to manufacture an undercover molded product of a desired shape.

DETAILED DESCRIPTION OF THE EMBODIMENTS

Hereinafter, the present invention will be explained in detail through the following examples and comparative examples.

However, these examples are presented only as illustrations of the present invention, and the present invention is not limited thereby, and it is obvious to one of ordinary knowledge in the art that various substitutions and modifications can be made without departing from the technical idea of the present invention.

Example 1

Polyethylene terephthalate having a melting point of 255° C. was melted through a continuous extruder, discharged through a spinneret (the shape of the cross-section of the spinning nozzle was "+"), solidified with a quench air, and drawn at a spinning velocity of 5000 m/min using a high pressure air drawing apparatus, thus preparing the first filament having fineness of 8 denier.

By controlling the fine holes of the spinneret, the first filament was prepared with a cross-sectional shape of "+", with a degree of non-circular shape of 2.0.

The second filament with a circular cross-section, having fineness of 8 denier was prepared by the same method as the first filament, except that a copolymerized polyester containing isophthalic acid as a copolymerization component and having a melting point of 180° C. was used, and passed through a spinneret equipped with circular spinning nozzles.

The first filament and the second filament were mixed such that the content of the second filament in the mixture became 30 wt %, the mixture was stacked in the form of a web at 1300 g/m² on a conveyer net, the web was subjected to a calendering process using a calender roll heated to 140° C. and afforded with flatness, and hot air of 160° C. was applied to the web for 26 seconds in a hot air treating apparatus in the form of tenter, thus manufacturing hot air-treated non-woven fabric.

Thereafter, on polyester non-woven fabric (polyethylene terephthalate non-woven fabric with a basis weight of 20 g/m², a thickness of 0.12 mm), a polypropylene film (basis weight 20 g/m², thickness of 15 μm) was placed, the hot air-treated non-woven fabric was placed thereon, polyester non-woven fabric was stacked again thereon, and they were laminated under high temperature (200° C.)-high pressure (80 kg/cm²), thus preparing a plate.

Thereafter, the plate was preheated in a mold having an internal temperature of 200° C. for 60 seconds, and press formed in a forming mold of a desired shape under conditions of a forming time of 1 minute and a thickness of 2.0 mm, thus manufacturing an undercover.

[Example 2] to [Example 7], [Comparative Example 1] to [Comparative Example 5]

Undercovers were manufactured by the same method as Example 1, except that the degree of non-circular shape of the first filament, the content of the second filament, and the temperature of hot air in Example 1 were changed as shown in the following Table 1.

TABLE 1

| | Degree of non-circular shape of the first filament | Content of the second filament | Temperature of hot air |
|---|---|---|---|
| Example 1 | 2.1 | 30 | 160 |
| Example 2 | 2.5 | 30 | 160 |
| Example 3 | 2.8 | 30 | 160 |
| Example 4 | 2.5 | 10 | 160 |
| Example 5 | 2.5 | 50 | 160 |
| Example 6 | 2.5 | 30 | 160 |
| Example 7 | 2.9 | 30 | 160 |
| Comparative Example 1 | 1.0 | 30 | 160 |
| Comparative Example 2 | 2.5 | 5 | 160 |
| Comparative Example 3 | 2.5 | 60 | 160 |
| Comparative Example 4 | 2.5 | 30 | 180 |
| Comparative Example 5 | 3.2 | 30 | 160 |

The cross-sections of the first filaments of Examples 6 and 7 were in the shape of "Y"

Using the samples prepared in the examples and comparative examples, the properties were evaluated as follows, and the results are shown in the following Table 2.

<Evaluation Method>

1. Thickness (Unit: mm)

According to the method A of ISO 9073-2 (Textiles—Test Methods for nonwovens), a test specimen with a size of 100 cm' was taken and measured.

2. Tensile Strength (N)

According to MS341-23:ASTM D5034 (Test Methods for Breaking Strength and Elongation of Textile fabric), tensile strength was measured under conditions of a test specimen size of 25 mm×150 mm, a test speed of 25 m m/min, and a clamp interval of 100 mm.

3. Flexural Strength (N), Flexural Modulus (MPa)

According to the method A of MS341-23:IS0 178 (Plastics—Dimension of Flexural Properties), flexural strength and flexural modulus were measured under conditions of a test specimen size of 50 mm×150 mm, a test speed of 5 m/min, and a span length of 100 mm.

4. Sound Absorption

According to MS341-23:IS0 R 354 (Acoustics—Measurement of absorption in a reverberation room), using ALPHA CABIN equipment, a sound absorption coefficient (a) was measured with an edge frameless test specimen of 840 mm×840 mm.

5. Spinnability

Spinnability was evaluated by measuring cutting according to time in the spinning process for manufacturing non-woven fabric and the number of filaments leaving at the inlet of drawing equipment.

(Evaluation standard, ○: 0 generated, Δ: 1~10 generated, X: 10 or more generated)

TABLE 2

|  | Thickness (mm) | Tensile strength of plate MD/CD (N) | Flexural strength of plate MD/CD (N) | Flexural modulus of plate MD/CD (MPa) | Sound absorption (at 5000 Hz) | Spinnability of filament |
|---|---|---|---|---|---|---|
| MS341-23 Spec.* | — | 1840/2050 or more | 17/19 or more | 750/920 or more | 0.48 or less | — |
| Example 1 | 2.1 | 2362/2343 | 26/27 | 1131/1149 | 0.43 | ○ |
| Example 2 | 2.2 | 2150/2098 | 28/28 | 1074/1095 | 0.41 | ○ |
| Example 3 | 2.3 | 2265/2168 | 27/26 | 1098/1036 | 0.36 | ○ |
| Example 4 | 2.2 | 1892/1957 | 20/22 | 941/982 | 0.40 | ○ |
| Example 5 | 2.1 | 2756/2695 | 32/29 | 1265/1158 | 0.42 | ○ |
| Example 6 | 2.1 | 2195/2279 | 27/28 | 1117/1023 | 0.40 | ○ |
| Example 7 | 2.2 | 2305/2243 | 28/26 | 1064/1038 | 0.37 | ○ |
| Comparative Example 1 | 1.8 | 2235/2298 | 25/27 | 1029/1036 | 0.59 | ○ |
| Comparative Example 2 | 2.1 | 1134/1297 | 12/14 | 582/563 | 0.38 | ○ |
| Comparative Example 3 | 2.2 | 1032/1162 | 10/10 | 647/692 | 0.39 | ○ |
| Comparative Example 4 | 2.2 | 1568/1620 | 14/16 | 468/569 | 0.42 | ○ |
| Comparative Example 5 | 2.5 | 845/943 | 9/10 | 365/525 | 0.34 | Δ |

*Automotive undercover standard of Hyundai Motor Company, Korea

From the results of Table 2, it is confirmed that in case the non-woven fabric of the examples according to the present invention is used in a core layer of a plate for an automotive undercover, mechanical properties and the sound absorption property required for a plate are simultaneously fulfilled.

It is also confirmed that in case the degree of non-circular shape of the first filament making up the non-woven fabric is low, sound absorption is not enhanced (Comparative Example 1), in case the degree of non-circular shape is high, spinnability of a filament is deteriorated (Comparative Example 5), and as the content of the second filament having a low melting point increases, strength including flexural modulus is improved, but in case the content is 60 wt %, exceeding the upper limit of the present invention (Comparative Example 3), strength rapidly decreases.

Further, in case the temperature of the hot air treatment is increased, tensile strength, flexural strength, and flexural modulus rapidly decrease (Example 2 and Comparative Example 4), and the mechanical properties required for a plate are not fulfilled, because the second filament having a low melting point is heat sealed and cannot sufficiently exert interlayer adhesion in the plate.

INDUSTRIAL APPLICABILITY

As described above, the non-woven fabric according to the present invention is applied for a plate for an automotive undercover and an undercover, in order to improve processability and formability by long fiber non-woven fabric consisting of a high melting point filament with a non-circular cross-section and a low melting point filament in the preparation of the undercover.

In addition, the non-woven fabric according to the present invention is applied to an automotive undercover, in order to enhance sound absorption.

The invention claimed is:

1. Long fiber non-woven fabric, consisting of a first filament of polyester having a melting point of 250° C. or more with a non-circular cross-section, and a second filament of polyester having a melting point of 180° C. or less with a circular cross-section, wherein, in the non-circular cross-section is in the shape of "+" or "Y", the content of the second filament is 10-50 wt %, and the sound absorption coefficient (MS341-23 Spec, @5000 Hz) is 0.48 or less,
   wherein the sound absorption coefficient (MS341-23 Spec, @5000 Hz) is a value measured with an edge frameless test specimen of 840 mm×840 mm using ALPHA CABIN equipment according to the standard test method of ISO R 354 (Acoustics-Measurement of absorption in a reverberation room), and
   wherein the degree of non-circular shape (diameter of a circle connecting outermost lines of the cross-section of filament/diameter of a central circle of the cross-section of filament) of the non-circular cross-section is 2.0-3.0.

2. An automotive undercover comprising long fiber non-woven fabric consisting of a first filament of polyester having a melting point of 250° C. or more with a non-circular cross-section, and a second filament of polyester having a melting point of 180° C. or less, wherein the non-circular cross-section is in the shape of "+" or "Y", the content of the second filament is 10-50 wt %, and the sound absorption coefficient (MS341-23 Spec, @5000 Hz) is 0.48 or less,
   wherein the sound absorption coefficient (MS341-23 Spec, @5000 Hz) is a value measured with an edge frameless test specimen of 840 mm×840 mm using ALPHA CABIN equipment according to the standard test method of ISO R 354 (Acoustics-Measurement of absorption in a reverberation room), and wherein the degree of non-circular shape (diameter of a circle connecting outermost lines of the cross-section of filament/diameter of the central circle of the cross-section of filament) of the non-circular cross-section is 2.0-3.0.

\* \* \* \* \*